United States Patent [19]

Hattori et al.

[11] 4,084,558
[45] Apr. 18, 1978

[54] AIR-TO-FUEL RATIO CONTROLLING SYSTEM FOR INTERNAL COMBUSTION ENGINES

[75] Inventors: Tadashi Hattori, Okazaki; Takamichi Nakase, Gamagori, both of Japan

[73] Assignee: Nippon Soken, Inc., Nishio, Japan

[21] Appl. No.: 660,976

[22] Filed: Feb. 24, 1976

[30] Foreign Application Priority Data

Feb. 27, 1975 Japan ................... 50-24585

[51] Int. Cl.² .................. G01N 3/00; F02M 23/04
[52] U.S. Cl. ................ 123/97 B; 123/119 D; 123/124 B
[58] Field of Search .............. 60/276, 285; 123/97 B, 123/124 B, 119 D, 119 DB, 32 EE, 32 EI

[56] References Cited

U.S. PATENT DOCUMENTS

| | | | |
|---|---|---|---|
| 3,703,162 | 11/1972 | Aono | 123/32 EI |
| 3,759,232 | 9/1973 | Wahl | 123/119 DB |
| 3,868,933 | 3/1975 | Bigalke | 123/119 D |
| 3,895,611 | 7/1975 | Endo | 60/276 |
| 3,919,983 | 11/1975 | Wahl | 60/276 |
| 3,964,457 | 6/1976 | Coscia | 123/124 B |
| 4,020,813 | 5/1977 | Hattori | 60/285 |
| 4,036,186 | 7/1977 | Hattori | 123/124 R |

*Primary Examiner*—Douglas Hart
*Attorney, Agent, or Firm*—Cushman, Darby & Cushman

[57] ABSTRACT

An air-to-fuel ratio controlling system for an internal combustion engine is provided with a deceleration detector for detecting the deceleration operation of the engine. In response to a signal delivered from the deceleration detector, a control valve mounted in the adjusting air path is maintained at a given valve angle for a predetermined period of the deceleration. Air is, thus, additionally supplied through the adjusting air path during the deceleration, thereby to prevent unduely rich of the air-fuel mixture during the deceleration and to enable the control of the air-to-fuel ratio properly.

6 Claims, 11 Drawing Figures

AIR-TO-FUEL RATIO CONTROLLING SYSTEM FOR INTERNAL COMBUSTION ENGINES

BACKGROUND OF THE INVENTION

1. Field of the Invention

The present invention relates to an air-to-fuel ratio controlling system for internal combustion engines.

When it is desired to attain an effect of anti-pollution by exhaust gases of an automobile to a maximum extent in an improved anti-pollution engine or to attain an optimum cleaning effect of exhaust gases by a catalytic converter in an engine, an air-to-fuel ratio of air-fuel mixture fed to the engine must always be properly controlled. The present invention is thus intended to meet such a requirement.

2. Description of the Prior Art

In a prior art system of this type, an oxygen concentration in exhaust gases from an engine is sensed as an electrical signal and fed to a determination circuit in which an air-to-fuel ratio of air-fuel mixture is determined to change a path area of an adjusting air path which bypasses a throttle valve and a fuel nozzle of a carburetor, that is, the amount of air bypassed, for controlling the air-to-fuel ratio.

In this system, however, at a transition of the engine, particularly at the deceleration thereof, the air-to-fuel ratio of the air-fuel mixture decreases (that is, the air-fuel mixture becomes rich) resulting in mis-fire or afterburn of the engine, which in turn causes a problem in that a required air-to-fuel ratio cannot be attained and in addition an exhaust gas cleaning device such as a catalytic converter is deteriorated or thermally broken.

SUMMARY OF THE INVENTION

It is an object of the present invention to overcome the above difficulty encountered at the deceleration of an engine and to reduce a cost of the system by eliminating the need of mounting a throttle positioner and other devices which have been used for the purpose of anti-pollution at the deceleration of the engine.

The above and other objects, features and advantages of the present invention will become more apparent from the following detailed description of the preferred embodiments of the present invention when taken in conjunction with the accompanying drawings.

DESCRIPTION OF THE PREFERRED EMBODIMENTS

Figure 1:
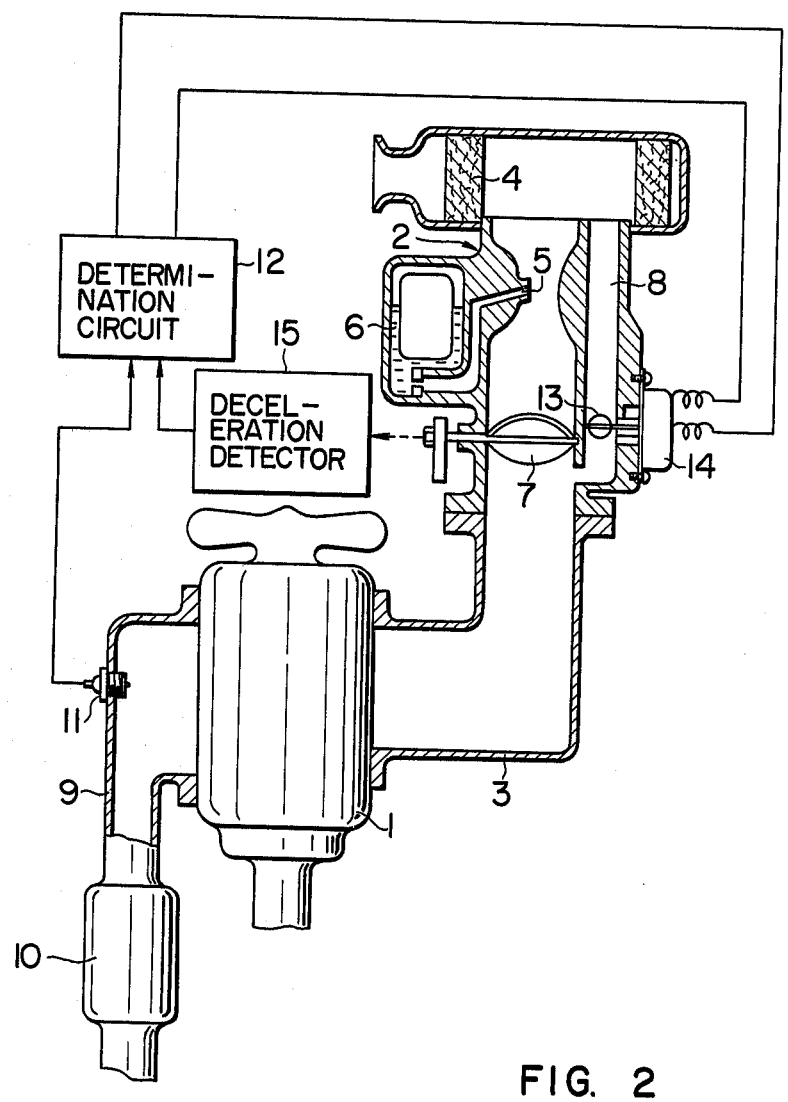
FIG. 1 is a system configuration showing one embodiment of the present invention.

Referring to FIG. 1, an internal combustion engine 1 is supplied with air-fuel mixture by a carburetor 2 through an intake manifold 3. The carburetor 2 may be of conventional type which mixes air from an air cleaner 4 with fuel to produce the air-fuel mixture, and comprises a fuel nozzle 5, a float chamber 6, and a throttle valve 7 linked to an accelerator pedal (not shown) for controlling the amount of the gas mixture.

The carburetor 2 further includes an adjusting air path 8 between the air cleaner 4 and a downstream end of the throttle valve 7, which air path bypasses the fuel nozzle 5 and the throttle valve 7.

An exhaust section of the engine 1 includes an exhaust manifold 9 through which the exhaust gas from the engine 1 is exhausted and a catalytic converter 10 downstream of the exhaust manifold 9 for purifying the exhaust gas. The exhaust manifold 9 is provided with an air-to-fuel ratio sensor 11 which is constructed by a well-known oxygen sensor such as a zirconum dioxide sensor.

Figure 2:
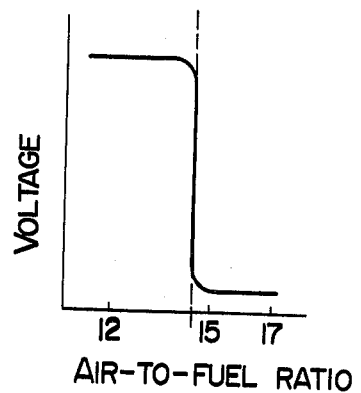
FIG. 2 is a graph showing an electromotive force characteristic of an air-to-fuel ratio senser.

An electromotive force of the air-to-fuel ratio sensor 11 changes stepwise, as shown in FIG. 2, depending on an oxygen concentration in the exhaust gas. That is, the electromotive force changes at an stoichiometric air-to-fuel ratio at which gasoline stoichiometrically burns perfectly, that is, at an ratio of about 14.7.

Electrical signals from the air-to-fuel ratio sensor 11 and the deceleration detector 15 are applied to a determination circuit 12. A control valve 13 which may be a conventional butterfly valve is mounted in the adjusting air path 8 for controlling an air flow rate. A pulse motor 14 is coupled to the control valve 13 to drive it, the direction of rotation and start-stop of the pulse motor being controlled by signals from the determination circuit 12. The deceleration detector 15 detects the deceleration of the engine 1 and produces an electrical signal. Due to the fact that the throttle valve 7 is near its fully closed position at deceleration, the deceleration detector 15 is constructed by a deceleration switch coupled and linked to a shaft of the throttle valve 7 so that a contact thereof is closed when the throttle valve 7 approaches its fully closed position.

Figure 3:
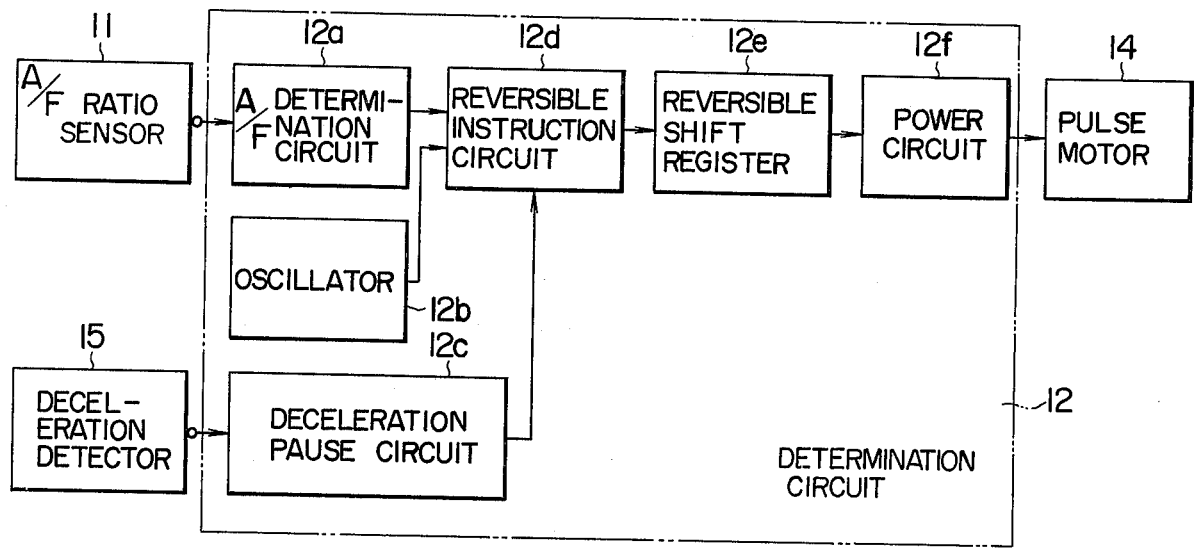
FIG. 3 is a block diagram of a determination circuit shown in FIG. 1.

FIG. 3 shows a block diagram of the determination circuit 12 which comprises an A/F determination circuit 12a to which an output signal from the air-to-fuel ratio sensor 11 is applied, an oscillator 12b, a deceleration pause circuit 12c to which an output from the deceleration detector 15 is applied, a reversible instruction circuit 12d connected to said three circuits 12a, 12b and 12c, a reversible shift register 12e connected to the reversible instruction circuit 12d, and a power circuit 12f connected to the reversible shift register 12e, an output of the power circuit 12f controlling the driving of the pulse motor 14.

Figure 4:
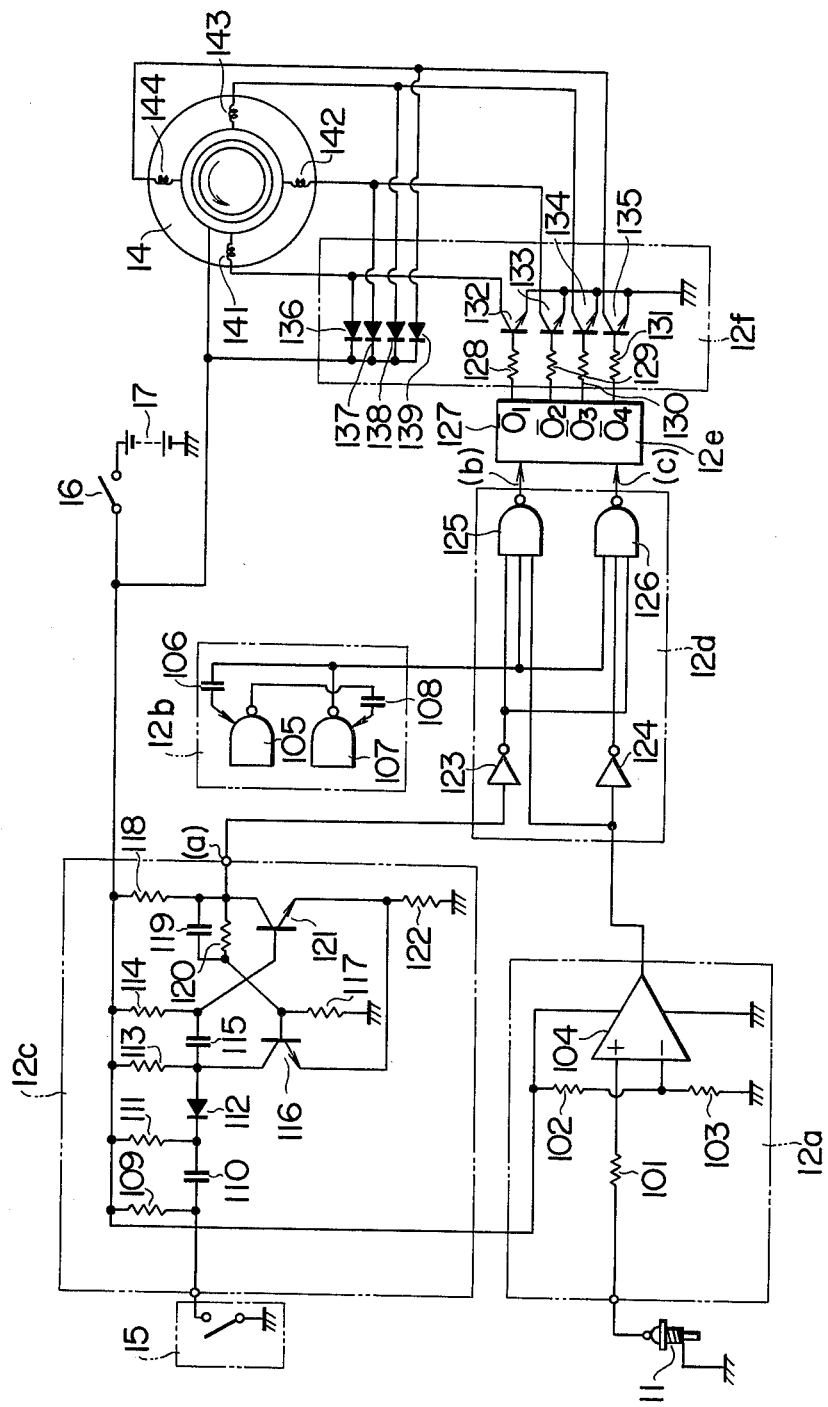
FIG. 4 shows an electrical circuit diagram of the determination circuit.
Figure 6:
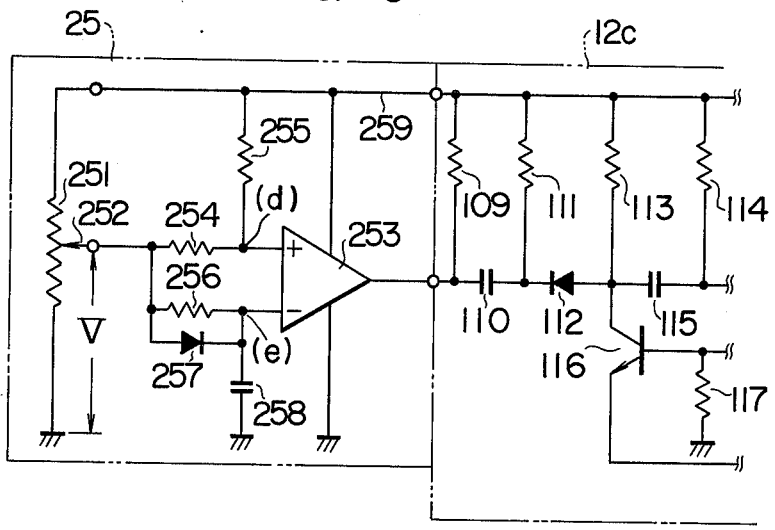
FIG. 6 is an electrical circuit diagram illustrating another embodiment of a deceleration detector.

Referring now to an electrical wiring diagram of the determination circuit 12 shown in FIG. 4, the operation of the above construction is explained. When an engine key switch 16 is turned on to complete power supply to an associated circuit from a power supply 17 and then the engine 1 is operated, the carburetor 2 undertakes the ordinary role of mixing air and fuel is not particularly set apart from any well-known carburetor. The only difference is that the air-to-fuel ratio is controlled to a slightly richer state than the eventual one that is intended to be obtained, and the air permitted through the carburetor 2 is mixed with the corresponding amount of fuel to form the mixture supplied to the engine 1. The exhaust gas produced after the combustion of the mixture in the engine 1 is exhausted through the exhaust manifold 9 and the catalytic converter 10 to the atmosphere, and the prevailing air-to-fuel ratio of the air-fuel mixture is detected by the air-to-fuel sensor 11, which is provided at a portion of the exhaust gas passage of the exhaust manifold 9. The output signal from the air-to-fuel ratio sensor 11 is applied to the A/F determination circuit 12a of the determination circuit 12 to determine whether the detected air-to-fuel ratio is smaller or larger than a stoichiometric air-to-fuel ratio. When it is smaller, the pulse motor 14 is driven in a direction to open the control valve 13 mounted in the adjusting air path 8 and when it is larger the pulse motor 14 is driven in a direction to close the control valve 13. In this manner the air-to-fuel ratio of the air-fuel mixture is adjusted by the adjusting air to obtain the stoichiometric air-to-fuel ratio. The control operation of the pulse motor 14 is explained with reference to FIGS. 4, 5A and 5B. The output signal of the air-to-fuel ratio sensor 11 is applied to the input of the A/F determination circuit 12a of the determination circuit 12, which comprises resistors 101, 102 and 103 and an operational amplifier 104, and compared with a setting voltage set by the resistors 102 and 103 (a voltage substantially equal to an electromotive force, when the air-to-fuel ratio sensor 11 produces the stoichiometric air-to-fuel ratio). When it is larger than the setting voltage, that is, when the detected air-to-fuel ratio is smaller than the stoichiometric air-to-fuel ratio, a "1" level output is produced and when it is smaller than the setting voltage, that is, the detected air-to-fuel ratio is larger than the stoichiometric air-to-fuel ratio, a "0" level output is produced. The oscillator 12b comprises NAND gates 105 and 107 having expander terminals and capacitors 106 and 108 forming an astable multivibrator, and has its pulse frequency established to perform an optimum control. The deceleration pause circuit 12c comprises a differentiating trigger circuit including resistors 109 and 111, a capacitor 110 and a diode 112, and a monostable multivibrator including resistors 113, 114, 117, 118, 120 and 122, capacitors 115 and 119 and transistors 116 and 121. At the deceleration of the engine 1, a contact switch of the deceleration detector 15 is closed and a negative differentiated trigger voltage is produced at the differentiating trigger circuit so that an output signal at a terminal a of the monostable multivibrator of the deceleration pause circuit 12c is inverted from a steady "0" level state to a "1" level state for a predetermined duration.

The outputs from the A/F determination circuit 12a, the oscillator 12b and the deceleration pause circuit 12c are applied to the reversible instruction circuit 12d, which in turn produces forward drive, backward drive or pause signal to the pulse motor 14. The reversible instruction circuit 12d comprises inverters 123 and 124 and NAND gates 125 and 126 forming a logic.

During a normal operation other than the deceleration, when the air-fuel mixture from the carburetor 2 is richer, the NAND gate 125 is opened and a pulse signal from the oscillator 12b is applied to an input terminal b of the reversible shift register 12e, and when the air-fuel mixture is leaner the NAND gate 126 is opened so that a similar pulse signal is applied to an input terminal c of the reversible shift register 12e. At the deceleration, the deceleration pause circuit 12c is actuated so that the NAND gates 125 and 126 of the reversible instruction circuit 12d and not opened and no pulse signal is applied to the input terminals b and c of the reversible shift register 12e.

Figures 5A, 5B:
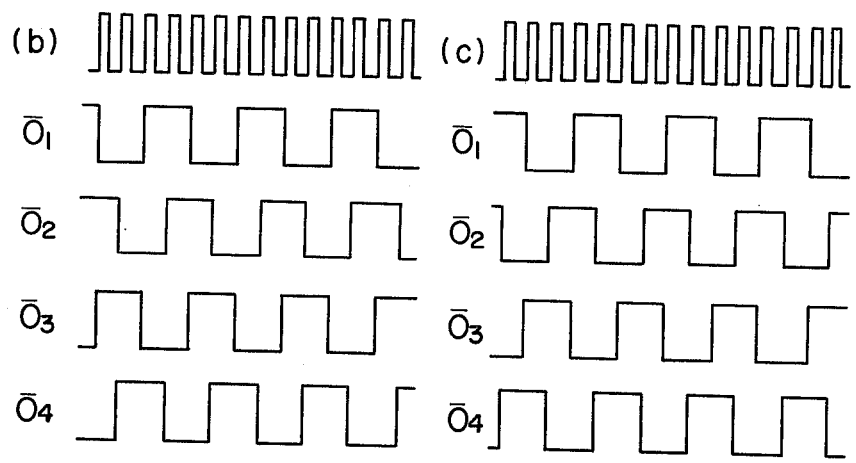
FIGS. 5A and 5B are time charts for illustrating the operation of a reversible shift register shown in FIG. 4.

As pulse signals are applied to the terminal b of the reversible shift register 12e, output terminals $\overline{O}_1$, $\overline{O}_2$, $\overline{O}_3$ and $\overline{O}_4$ thereof are sequentially shifted as shown in FIG. 5A. Conversely, when the pulse signals are applied to the terminal c, the output terminals $\overline{O}_4$, $\overline{O}_3$, $\overline{O}_2$ and $\overline{O}_1$ are sequentially shifted as shown in FIG. 5B. The output terminals $\overline{O}_1$, $\overline{O}_2$, $\overline{O}_3$ and $\overline{O}_4$ are connected to the power circuit 12f comprising resistors 128, 129, 130 and 131, transistors 132, 133, 134 and 135, and back electromotive force absorbing diode 136, 137, 138 and 139, and the power circuit 12f is further connected to field coils 141, 142, 143 and 144 of the pulse motor 14. As pulse signals are applied to the input terminal b of the reversible shift register 12e, the transistors 132, 133, 134 and 135 are sequentially conducted so that two phases of the field coils 141, 142, 143 and 144 of the pulse motor 14 are sequentially excited to rotate a rotor of the pulse motor 14 in the direction as shown by an arrow in the drawing. Namely, except when in deceleration, if the air-to-fuel ratio is smaller the pulse motor 14 is driven in the direction to open the control valve 13. When the pulse signals are applied to the terminal c, a reverse operation occurs and the pulse motor 14 rotates in the direction opposite to the arrow shown in FIG. 4 to close the control valve 13. When the deceleration occurs while the control valve 13 is being operated in accordance with the air-to-fuel ratio as described above, the deceleration pause circuit 12c is actuated by the signal from the deceleration detector 15 so that no pulse signal is sent to the reversible shift register 12e and the control valve 13 pauses for a given time period while maintaining the aperture at the detection of the deceleration. After the given time period, the control valve 13 is again controlled by the signal from the air-to-fuel ratio sensor 11. Thus, during said given time period in the deceleration time, the adjusting air is supplied independently of the signal from the air-to-fuel sensor 11 to feed additional air so the the air-to-fuel ratio of the air-fuel mixture is prevented from becoming too rich.

It should be understood that the present invention is not restricted to the above specific embodiment but the following deceleration detector may be alternatively used.

Figure 7:
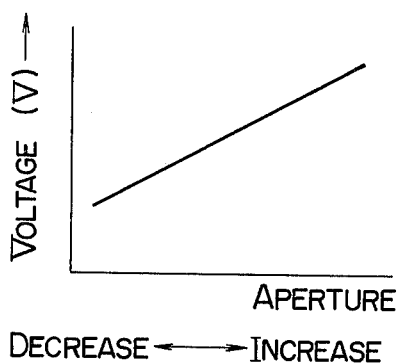
FIG. 7 is a graph showing a relationship between an output voltage V of a potentiometer shown in FIG. 6 and an aperture of a throttle valve.

Another embodiment of the deceleration detector is now explained in conjunction with FIGS. 6 to 8C. The deceleration detector is generally designated by reference numeral 25, which comprises a conventional potentiometer 251, a movable arm 252 of which is linked to a shaft of the throttle valve 7 so that a resistance of the potentiometer 251 varies with the aperture of the throttle valve 7 and a voltage V across the movable arm 252 and ground and varies with the aperture of the throttle valve 7 as shown in FIG. 7. A conventional IC operational amplifier 253 is provided, and has a non-inverting input terminal (+) and an inverting input terminal (−). Connected to the non-inverting input terminal are resistors 254 and 255 forming an L-network through which the output voltage V of the potentiometer 251 is applied. Connected to the inverting input terminal are a resistor 256, a diode 257 and a capacitor 258 forming an L-network through which the output voltage V of the potentiometer 251 is applied. The diode 257 is connected in parallel with the resistor 258 for rapidly charging the capacitor 258 when the output voltage V rises. The magnitudes of the resistors 254, 255 and 256 and the capacitors 258 are properly selected such that when the voltage V remains unchanged a relation of $Vd > Ve$ is attained, where $Vd$ is the voltage at a terminal $d$ and $Ve$ is the voltage at terminal $e$, and when the voltage V decreases a relation of $Vd < Ve$ is attained only during the transition period by making use of a time constant determined by the magnitudes of the resistor 256 and the capacitor 258.

An output terminal of the operational amplifier 253 is connected to the junction of the resistor 109 and the capacitor 110 of the deceleration pause circuit 12c and a power line 259 is connected to a power terminal of the resistor 209.

Figure 8A:
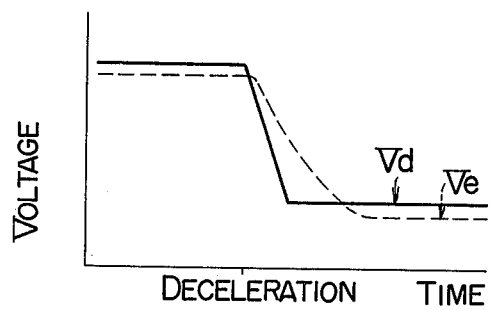
FIGS. 8A, 8B and 8C are time charts for illustrating the operation of the deceleration detector shown in FIG. 6.
Figure 8B:
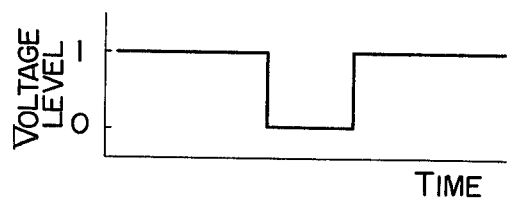
Figure 8C:
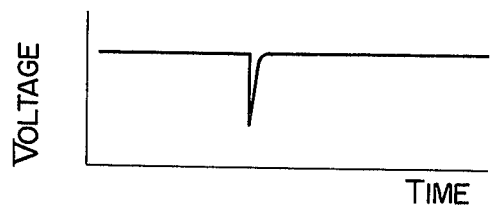

With this arrangement, during the deceleration of the engine 1, as the aperture of the throttle valve 7 decreases, the output voltage V of the potentiometer 251 decreases accordingly. The voltage $Vd$ at the terminal $d$, therefore, falls relatively rapidly as shown by a solid line in FIG. 8A. On the other hand, the voltage $Ve$ at the terminal $e$ falls relatively slowly because of the capacitor 258, as shown by a broken line in FIG. 8A. Accordingly, at the deceleration period, the relation of $Vd < Ve$ temporarily appears and the output signal from the operational amplifier 253 changes from "1" level to "0" level for that period, as shown in FIG. 8B. As a result, the differentiating trigger circuit of the deceleration pause circuit 12c produces a negative-going differentiated trigger voltage as shown in FIG. 8C, which actuates the monostable multivibrator of the deceleration pause circuit 12c. The subsequent operation is similar to that of the first embodiment and hence the explanation thereof is omitted. When the deceleration detector 25 of this construction is used, the operation of the throttle valve 7 can be more precisely detected than when the construction of the first embodiment is used, so that the deceleration of the engine 1 can be very precisely detected. While the voltage V of the potentiometer 251 in the deceleration detector 25 changes also during the acceleration, the voltage relation of $Vd > Ve$ can be maintained because the capacitor 258 is rapidly charged by the diode 257 and hence the output signal of the deceleration detector 25 does not change during the acceleration. In this manner, the detection of the deceleration of the engine 1 can be accomplished at a high sensitivity even when the acceleration and deceleration are repeated rapidly.

As the alternatives of the deceleration detector, a conventional electromagnetic generator may be coupled to a shaft of the throttle valve, or the deceleration may be detected by detecting the rotation speed of the engine 1 and at the same time detecting a fully closed condition of the throttle valve.

As described hereinabove, according to the present invention, the control valve 13 mounted in the adjusting air path 8 is stopped while it is maintained at a given control valve angle (aperture) for a predetermined period during the deceleration, by the signal from the deceleration detector 15 which detects the deceleration of the engine 1 so that air can be additionally supplied to the fuel from the adjusting air path 8 during the deceleration. Accordingly, significant advantages are obtained, such as, preventing unduly rich air-fuel mixture during the deceleration, enabling a proper control of the air-to-fuel ratio, preventing the decrease of the purifying ability of the catalytic converter 10 mounted in the exhaust system of the engine 1 during the deceleration, and preventing the deterioration and thermal destruction of the catalyst, and at the same time eliminating the need of the addition of a throttle positioner which have been used in the prior art system as countermeasures to the deceleration of the engine and allowing the use of the air-to-fuel ratio control system as it is, reducing the number of parts required and the cost of the entire exhaust gas purifying system.

What is claimed is:

1. An air-to-fuel ratio controlling system for an internal combustion engine comprising;
    a carburetor connected to an intake pipe of the internal combustion engine for supplying air-fuel mixture to said engine,
    said carburetor including a first passage through which the air-fuel mixture is passed and a throttle valve for controlling the amount of said air-fuel mixture passing therethrough,
    a second passage for introducing additional air into said intake pipe,
    a control valve mounted in said second passage for controlling the amount of additional air passing therethrough to compensate for the air-to-fuel ratio of said air-fuel mixture,
    a drive motor coupled to said control valve for driving the same,
    air-to-fuel ratio sensing means mounted in an exhaust gas system of said engine for detecting the change in the composition of the exhaust gas to determine an air-to-fuel ratio of the air-fuel mixture supplied to said engine for producing an electrical signal representing the detected ratio,
    deceleration detecting means for detecting the deceleration of said engine and producing an electrical signal, and
    an electrical control circuit connected to said air-to-fuel ratio sensing means and said deceleration detecting means and responsive to the electrical signal from said air-to-fuel ratio sensing means to actuate said drive motor for controlling the amount of the additional air so that the air-to-fuel ratio of said air-fuel mixture has a preset value,
    said electrical control circuit being also responsive to the electrical signal from said deceleration detecting means to stop said drive motor for a predetermined period after the start of the deceleration of said engine, independently of the electrical signal from said air-to-fuel ratio sensing means for interrupting the operation of said control valve.

2. An air-to-fuel ratio controlling system for an internal combustion engine according to claim 1 wherein;
    said deceleration detecting means comprises a potentiometer coupled to said throttle valve a resistance of which changes with the change in aperture of said throttle valve, and a differential amplifier circuit connected to said potentiometer to detect the resistance change of said potentiometer as a change in voltage for producing a corresponding electrical signal.

3. An air-to-fuel ratio controlling system for an internal combustion engine according to claim 2 wherein;
    said deceleration detecting means further comprises means for preventing the electrical signal produced from said differential amplifier from being changed with the change in the aperture of said throttle valve.

4. An air-to-fuel ratio controlling system for an internal combustion engine according to claim 1 wherein;
    said deceleration detecting means comprises a deceleration switch coupled to said throttle valve, which is adapted to be turned on near a fully closed position of said throttle valve.

5. An air-to-fuel ratio controlling system for an internal combustion engine according to claim 1 wherein;
   said drive motor comprises a pulse motor having field coils and controlled by pulse signals.

6. An air-to-fuel ratio controlling system for an internal combustion engine according to claim 5 wherein;
   said electric control circuit comprises;
   a differentiating trigger circuit responsive to an input electrical signal from said deceleration detecting means to produce a differentiated trigger signal,
   a multivibrator responsive to said differentiated trigger signal from said differentiating trigger circuit to invert an output signal level thereof for a predetermined time period,
   an A/F determination circuit for receiving the electrical signal from said air-to-fuel ratio sensing means as an input signal thereto and determining whether the input electrical signal is above a predetermined value or not to produce an electrical signal,
   an oscillator circuit for generating pulses to drive said pulse motor,
   a reversible instruction circuit for receiving the output signals from said multivibrator, said A/F determination circuit and said oscillator circuit as input signals thereto for producing electrical signals for instructing forward drive, backward drive and pause of said pulse motor,
   a reversible shift register responsive to input electrical signals from said reversible instruction circuit to have its output electrical signals sequentially shifted, and
   a power circuit responsive to the electrical signal from said reversible shift register to control feeding of field coils of said pulse motor.

* * * * *